United States Patent
Lipner et al.

(10) Patent No.: US 10,420,406 B2
(45) Date of Patent: Sep. 24, 2019

(54) PROTECTIVE COVER FOR ELECTRONIC DEVICE

(71) Applicant: OTTER PRODUCTS, LLC, Fort Collins, CO (US)

(72) Inventors: Aaron M. Lipner, San Diego, CA (US); Oscar L. Lopez, Descanso, CA (US); Lan Nguyen, San Diego, CA (US)

(73) Assignee: Otter Products, LLC, Fort Collins, CO (US)

( * ) Notice: Subject to any disclaimer, the term of this patent is extended or adjusted under 35 U.S.C. 154(b) by 1 day.

(21) Appl. No.: 15/879,121

(22) Filed: Jan. 24, 2018

(65) Prior Publication Data

US 2018/0228259 A1 Aug. 16, 2018

Related U.S. Application Data

(60) Provisional application No. 62/460,004, filed on Feb. 16, 2017.

(51) Int. Cl.
*A45C 11/38* (2006.01)
*H04R 1/44* (2006.01)
(Continued)

(52) U.S. Cl.
CPC .............. *A45C 11/00* (2013.01); *A45C 11/38* (2013.01); *B29C 45/0013* (2013.01); *H04R 1/44* (2013.01);
(Continued)

(58) Field of Classification Search
CPC ... A45C 11/00; A45C 11/38; A45C 2011/001; A45C 2011/002; A45C 2011/003;
(Continued)

(56) References Cited

U.S. PATENT DOCUMENTS 2,392,787 A  1/1946  Edmond
3,023,885 A  3/1962  Kindseth
(Continued)

FOREIGN PATENT DOCUMENTS

AU  2013101187  10/2013
CN  2921496  7/2007
(Continued)

OTHER PUBLICATIONS

Donaldson Filtration Solutions, Acoustic Vents for Portable Electronics, dated 2012-2017, downloaded from https://www.donaldson.com/content/dam/donaldson/venting/literature/north-america/Brochures/acoustic-vents-portable-electronics/Acoustic-Vents-for-Portable-Electronics.pdf Jan. 16, 2018, 4 pages.
(Continued)

*Primary Examiner* — Yuwen Pan
*Assistant Examiner* — Paul P Tran

(57) ABSTRACT

A cover for protecting an audio port of an electronic device is provided. The cover includes a check valve, a bellows, and an air vent. The check valve moves between a first position to allow audio pressure to exit the audio port and a second position to fluidly seal the audio port. The bellows at least partially surround the audio port when the cover is attached to the electronic device and move the check valve from the first position to the second position in response to a pressure exerted on the bellows. The air vent is attached to the bellows and allows audio pressure to pass through the air vent and to restrict passage of at least some water through the air vent.

18 Claims, 7 Drawing Sheets

(51) Int. Cl.
*H04R 7/12* (2006.01)
*B29C 45/00* (2006.01)
*H04R 7/20* (2006.01)
*A45C 11/00* (2006.01)

(52) U.S. Cl.
CPC .............. *H04R 7/12* (2013.01); *H04R 7/20* (2013.01); *A45C 2011/001* (2013.01); *A45C 2011/002* (2013.01); *A45C 2011/003* (2013.01)

(58) Field of Classification Search
CPC . B29C 45/0001; B29C 45/0013; B32B 5/028; B32B 7/12; B32B 27/12; B29K 2507/04; B29L 203/38; G06F 1/163; G06F 1/1656; G06F 1/182; G10K 11/168; G10K 11/18; H04M 1/03; H04M 1/18; H04R 1/02; H04R 1/023; H04R 1/086; H04R 7/00; H04R 7/12; H04R 7/20; H04R 1/026; H04R 1/44; H04R 9/06
USPC ....................................... 455/575.8
See application file for complete search history.

(56) References Cited

U.S. PATENT DOCUMENTS

| | | |
|---|---|---|
| D216,853 S | 3/1970 | Schuman |
| D220,233 S | 3/1971 | Sehurman |
| 3,590,988 A | 7/1971 | Hollar |
| 4,326,102 A | 4/1982 | Culp et al. |
| 4,352,968 A | 10/1982 | Pounds |
| D275,822 S | 10/1984 | Gatland et al. |
| D284,372 S | 6/1986 | Carpenter |
| 4,703,161 A | 10/1987 | McLean |
| 4,733,776 A | 3/1988 | Ward |
| 4,736,418 A | 4/1988 | Steadman |
| 4,762,227 A | 8/1988 | Patterson |
| 4,836,256 A | 6/1989 | Meliconi |
| 4,901,852 A | 2/1990 | King |
| 5,002,184 A | 3/1991 | Lloyd |
| 5,025,921 A | 6/1991 | Gasparaitis et al. |
| 5,092,458 A | 3/1992 | Yokoyama |
| 5,092,459 A | 3/1992 | Uljanic et al. |
| 5,123,044 A | 6/1992 | Tate |
| D327,646 S | 7/1992 | Hardigg et al. |
| D329,747 S | 9/1992 | Embree |
| D330,329 S | 10/1992 | Brightbill |
| 5,175,873 A | 12/1992 | Goldenberg et al. |
| D335,220 S | 5/1993 | Ward et al. |
| 5,230,016 A | 7/1993 | Yasuda |
| D342,609 S | 12/1993 | Brightbill |
| D347,324 S | 5/1994 | Dickinson |
| D347,732 S | 6/1994 | Wentz |
| D348,472 S | 7/1994 | Cyfko |
| 5,360,108 A | 11/1994 | Alagia |
| 5,368,159 A | 11/1994 | Doria |
| D353,048 S | 12/1994 | VanSkiver et al. |
| 5,386,084 A | 1/1995 | Risko |
| 5,388,692 A | 2/1995 | Withrow et al. |
| 5,499,713 A | 3/1996 | Huffer |
| 5,625,688 A | 4/1997 | Ford et al. |
| D381,512 S | 7/1997 | Green |
| 5,648,757 A | 7/1997 | Vernace et al. |
| 5,681,122 A | 10/1997 | Burke |
| D386,611 S | 11/1997 | Sheu |
| 5,812,188 A | 9/1998 | Adair |
| 5,828,012 A | 10/1998 | Repolle et al. |
| D402,105 S | 12/1998 | Erickson |
| 5,850,915 A | 12/1998 | Tajima |
| 5,873,814 A | 2/1999 | Adair |
| D409,374 S | 5/1999 | Laba et al. |
| D412,062 S | 7/1999 | Potter et al. |
| 5,923,752 A | 7/1999 | McBride et al. |
| D413,202 S | 8/1999 | Schmitt et al. |
| D413,203 S | 8/1999 | Zurwelle et al. |
| D419,297 S | 1/2000 | Richardson et al. |
| D419,767 S | 2/2000 | Richardson et al. |
| D419,768 S | 2/2000 | Richardson et al. |
| 6,031,524 A | 2/2000 | Kunert |
| 6,041,924 A | 3/2000 | Tajima |
| 6,049,813 A | 4/2000 | Danielson et al. |
| D423,772 S | 5/2000 | Cooper et al. |
| 6,068,119 A | 5/2000 | Derr et al. |
| 6,082,535 A | 7/2000 | Mitchell |
| 6,094,785 A | 8/2000 | Montgomery et al. |
| D433,133 S | 10/2000 | Dyer |
| D433,798 S | 11/2000 | Weinstock |
| D439,407 S | 3/2001 | Parker |
| 6,201,867 B1 | 3/2001 | Koike |
| 6,215,474 B1 | 4/2001 | Shah |
| 6,239,968 B1 | 5/2001 | Kim et al. |
| D443,133 S | 6/2001 | Richardson et al. |
| 6,273,252 B1 | 8/2001 | Mitchell |
| 6,301,100 B1 | 10/2001 | Iwata |
| D451,094 S | 11/2001 | Powell |
| 6,313,892 B2 | 11/2001 | Gleckman |
| 6,313,982 B1 | 11/2001 | Hino |
| 6,317,313 B1 | 11/2001 | Mosgrove et al. |
| 6,388,877 B1 | 5/2002 | Canova et al. |
| 6,415,138 B2 | 7/2002 | Sirola et al. |
| 6,445,577 B1 | 9/2002 | Madsen et al. |
| 6,456,487 B1 | 9/2002 | Hetterick |
| 6,471,056 B1 | 10/2002 | Tzeng |
| D465,330 S | 11/2002 | Parker |
| 6,512,834 B1 | 1/2003 | Banter et al. |
| D470,659 S | 2/2003 | Story et al. |
| 6,519,141 B2 | 2/2003 | Tseng et al. |
| 6,536,589 B2 | 3/2003 | Chang |
| D472,384 S | 4/2003 | Richardson |
| 6,617,973 B1 | 9/2003 | Osterman |
| 6,646,864 B2 | 11/2003 | Richardson |
| 6,659,274 B2 | 12/2003 | Enners |
| 6,665,174 B1 | 12/2003 | Derr et al. |
| 6,701,159 B1 | 3/2004 | Powell |
| 6,731,913 B2 | 5/2004 | Humphreys et al. |
| 6,785,566 B1 | 8/2004 | Irizarry |
| 6,839,430 B2 | 1/2005 | Kwak |
| 6,926,141 B2 | 8/2005 | Montler |
| 6,932,187 B2 | 8/2005 | Banter et al. |
| 6,950,516 B2 | 9/2005 | Pirilä et al. |
| 6,954,405 B2 | 10/2005 | Polany et al. |
| 6,962,454 B1 | 11/2005 | Costello |
| D513,123 S | 12/2005 | Richardson et al. |
| 6,980,777 B2 | 12/2005 | Shepherd et al. |
| D513,451 S | 1/2006 | Richardson et al. |
| D514,808 S | 2/2006 | Morine et al. |
| D515,588 S | 2/2006 | Kirkwood |
| 6,995,976 B2 | 2/2006 | Richardson |
| D516,309 S | 3/2006 | Richardson et al. |
| D516,553 S | 3/2006 | Richardson et al. |
| D516,554 S | 3/2006 | Richardson et al. |
| D516,556 S | 3/2006 | Graziano |
| D516,807 S | 3/2006 | Richardson et al. |
| 7,031,148 B1 | 4/2006 | Lin |
| 7,054,441 B2 | 5/2006 | Pletikosa |
| 7,061,762 B2 | 6/2006 | Canova et al. |
| 7,069,063 B2 | 6/2006 | Halkosaari et al. |
| D526,780 S | 8/2006 | Richardson et al. |
| D530,079 S | 10/2006 | Thomas et al. |
| 7,146,701 B2 | 12/2006 | Mahoney et al. |
| 7,147,105 B2 | 12/2006 | Gammons |
| 7,158,376 B2 | 1/2007 | Richardson et al. |
| 7,180,735 B2 | 2/2007 | Thomas et al. |
| 7,194,291 B2 | 3/2007 | Peng |
| D542,524 S | 5/2007 | Richardson et al. |
| 7,230,823 B2 | 6/2007 | Richardson et al. |
| 7,236,588 B2 | 6/2007 | Gartrell |
| 7,255,228 B2 | 8/2007 | Kim |
| 7,290,654 B2 | 11/2007 | Hodges |
| D557,264 S | 12/2007 | Richardson et al. |
| D557,897 S | 12/2007 | Richardson et al. |
| 7,312,984 B2 | 12/2007 | Richardson et al. |
| 7,341,144 B2 | 3/2008 | Tajiri et al. |
| 7,343,184 B2 | 3/2008 | Rostami |

(56) References Cited

U.S. PATENT DOCUMENTS

| | | |
|---|---|---|
| 7,400,917 B2 | 7/2008 | Wood et al. |
| D574,819 S | 8/2008 | Andre et al. |
| D575,056 S | 8/2008 | Tan |
| 7,409,148 B2 | 8/2008 | Takahashi et al. |
| 7,418,278 B2 | 8/2008 | Eriksson et al. |
| 7,428,427 B2 | 9/2008 | Brunstrom et al. |
| 7,436,653 B2 | 10/2008 | Yang et al. |
| D581,155 S | 11/2008 | Richardson et al. |
| D581,421 S | 11/2008 | Richardson et al. |
| 7,449,650 B2 | 11/2008 | Richardson et al. |
| D582,149 S | 12/2008 | Tan |
| D587,008 S | 2/2009 | Richardson et al. |
| 7,495,895 B2 | 2/2009 | Carnevali |
| D589,016 S | 3/2009 | Richardson et al. |
| D593,319 S | 6/2009 | Richardson et al. |
| D593,746 S | 6/2009 | Richardson et al. |
| 7,555,325 B2 | 6/2009 | Goros |
| D597,089 S | 7/2009 | Khan et al. |
| 7,558,594 B2 | 7/2009 | Wilson |
| D597,301 S | 8/2009 | Richardson et al. |
| 7,594,576 B2 | 9/2009 | Chen et al. |
| D601,799 S | 10/2009 | Andre et al. |
| 7,609,512 B2 | 10/2009 | Richardson et al. |
| D603,602 S | 11/2009 | Richardson et al. |
| D603,603 S | 11/2009 | Laine et al. |
| 7,623,898 B2 | 11/2009 | Holmberg |
| D605,850 S | 12/2009 | Richardson et al. |
| D606,751 S | 12/2009 | Andre et al. |
| 7,641,046 B2 | 1/2010 | Tsang et al. |
| 7,663,878 B2 | 2/2010 | Swan et al. |
| 7,663,879 B2 | 2/2010 | Richardson et al. |
| 7,688,580 B2 | 3/2010 | Richardson et al. |
| D613,282 S | 4/2010 | Richardson et al. |
| 7,854,434 B2 | 12/2010 | Heiman et al. |
| 7,933,122 B2 | 4/2011 | Richardson et al. |
| D646,673 S | 10/2011 | Fathollahi |
| 8,112,130 B2 | 2/2012 | Mittleman et al. |
| 8,113,482 B2 | 2/2012 | Hunnicutt |
| 8,290,546 B2 | 10/2012 | Chen et al. |
| 8,342,325 B2 | 1/2013 | Rayner |
| 8,439,191 B1 | 5/2013 | Lu |
| 8,531,834 B2 | 9/2013 | Rayner |
| 8,605,892 B1 | 12/2013 | Owens et al. |
| 8,695,798 B2 | 4/2014 | Simmer |
| 8,724,841 B2 * | 5/2014 | Bright .................. H04R 1/086 181/284 |
| 8,798,304 B2 | 8/2014 | Miller et al. |
| 8,919,549 B1 | 12/2014 | Tashjian |
| 9,173,314 B2 | 10/2015 | Richardson et al. |
| 9,185,480 B2 | 11/2015 | Howes et al. |
| 9,241,551 B2 | 1/2016 | Lawson et al. |
| 9,380,369 B2 * | 6/2016 | Utterman .............. H04R 1/086 |
| 9,532,633 B1 | 1/2017 | Tan et al. |
| 9,545,140 B1 | 1/2017 | Johnson et al. |
| 9,609,930 B2 | 4/2017 | Richardson et al. |
| 9,795,044 B2 * | 10/2017 | Lai ..................... H04R 1/02 |
| 9,800,962 B2 | 10/2017 | Lai et al. |
| 9,853,674 B2 | 12/2017 | Gandhi et al. |
| 2001/0048586 A1 | 12/2001 | Itou et al. |
| 2002/0009195 A1 | 1/2002 | Schon |
| 2002/0065054 A1 | 5/2002 | Humphreys et al. |
| 2002/0071550 A1 | 6/2002 | Pletikosa |
| 2002/0079244 A1 | 6/2002 | Kwong |
| 2002/0086702 A1 | 7/2002 | Lai et al. |
| 2002/0101707 A1 | 8/2002 | Canova et al. |
| 2002/0136557 A1 | 9/2002 | Shimamura |
| 2002/0137475 A1 | 9/2002 | Shou et al. |
| 2002/0193136 A1 | 12/2002 | Halkosaari et al. |
| 2003/0151890 A1 | 8/2003 | Huang et al. |
| 2004/0014506 A1 | 1/2004 | Kemppinen |
| 2005/0139498 A1 | 6/2005 | Goros |
| 2005/0279661 A1 | 12/2005 | Hodges |
| 2006/0124482 A1 | 6/2006 | Hodges |
| 2006/0186001 A1 | 8/2006 | Anderson et al. |
| 2006/0226039 A1 | 10/2006 | Goradesky |
| 2006/0255493 A1 | 11/2006 | Fouladpour |
| 2006/0279924 A1 | 12/2006 | Richardson et al. |
| 2007/0071423 A1 | 3/2007 | Fantone et al. |
| 2007/0086273 A1 | 4/2007 | Polany et al. |
| 2007/0115387 A1 | 5/2007 | Ho |
| 2007/0158220 A1 | 7/2007 | Cleereman et al. |
| 2007/0261978 A1 | 11/2007 | Sanderson |
| 2007/0297149 A1 | 12/2007 | Richardson et al. |
| 2008/0041896 A1 | 2/2008 | Holmberg |
| 2008/0083631 A1 | 4/2008 | Tsang et al. |
| 2008/0096620 A1 | 4/2008 | Lee et al. |
| 2008/0190528 A1 | 8/2008 | Steinberg |
| 2008/0316687 A1 | 12/2008 | Richardson et al. |
| 2009/0009945 A1 | 1/2009 | Johnson et al. |
| 2009/0036175 A1 | 2/2009 | Brandenburg et al. |
| 2009/0072786 A1 | 3/2009 | Lin et al. |
| 2009/0080153 A1 | 3/2009 | Richardson et al. |
| 2009/0247244 A1 | 10/2009 | Mittleman et al. |
| 2009/0283184 A1 | 11/2009 | Han |
| 2010/0072334 A1 | 3/2010 | Gette et al. |
| 2010/0093401 A1 | 4/2010 | Moran et al. |
| 2010/0093412 A1 | 4/2010 | Serra et al. |
| 2010/0096284 A1 | 4/2010 | Bau |
| 2010/0096963 A1 | 4/2010 | McLaughlin et al. |
| 2010/0104814 A1 | 4/2010 | Richardson et al. |
| 2010/0122756 A1 | 5/2010 | Longinotti-Buitoni |
| 2010/0200456 A1 | 8/2010 | Parkinson |
| 2010/0203931 A1 | 8/2010 | Hynecek et al. |
| 2010/0240427 A1 | 9/2010 | Lee |
| 2011/0017620 A1 | 1/2011 | Latchford et al. |
| 2011/0095033 A1 | 4/2011 | Hung |
| 2011/0157800 A1 | 6/2011 | Richardson et al. |
| 2011/0226545 A1 | 9/2011 | Richardson et al. |
| 2011/0261986 A1 | 10/2011 | Murayama |
| 2012/0031788 A1 | 2/2012 | Mongan et al. |
| 2012/0034837 A1 * | 2/2012 | Ngai ................ A61F 13/51458 442/394 |
| 2012/0071217 A1 | 3/2012 | Park |
| 2012/0091025 A1 | 4/2012 | Wyner et al. |
| 2012/0168056 A1 | 7/2012 | Antonini |
| 2012/0168336 A1 | 7/2012 | Schmidt et al. |
| 2012/0207314 A1 * | 8/2012 | Gautama ................ H04R 3/002 381/55 |
| 2012/0228181 A1 | 9/2012 | Damon et al. |
| 2012/0261289 A1 | 10/2012 | Wyner et al. |
| 2012/0314354 A1 | 12/2012 | Rayner |
| 2012/0325720 A1 | 12/2012 | Tages et al. |
| 2013/0027849 A1 | 1/2013 | Berumen |
| 2013/0043777 A1 | 2/2013 | Rayner |
| 2013/0063004 A1 | 3/2013 | Lai et al. |
| 2013/0063874 A1 | 3/2013 | Yi et al. |
| 2013/0098788 A1 | 4/2013 | McCarville et al. |
| 2013/0098790 A1 | 4/2013 | Hong et al. |
| 2013/0118934 A1 | 5/2013 | Green et al. |
| 2013/0156218 A1 | 6/2013 | Annacone et al. |
| 2013/0292288 A1 | 11/2013 | Willes |
| 2013/0308809 A1 * | 11/2013 | Thompson ........... H04R 1/2834 381/332 |
| 2013/0334071 A1 | 12/2013 | Carnevali |
| 2014/0045557 A1 | 2/2014 | Chung |
| 2014/0076767 A1 | 3/2014 | McFarland |
| 2014/0112652 A1 | 4/2014 | Latto et al. |
| 2014/0133687 A1 * | 5/2014 | Lee ..................... H04R 1/083 381/355 |
| 2014/0221056 A1 | 8/2014 | Gandhi et al. |
| 2014/0252786 A1 | 9/2014 | Singhal |
| 2014/0262847 A1 | 9/2014 | Yang |
| 2014/0294217 A1 | 10/2014 | Yamaguchi et al. |
| 2014/0339012 A1 | 11/2014 | Richardson et al. |
| 2015/0171913 A1 | 6/2015 | Rayner |
| 2015/0207911 A1 | 7/2015 | Lin |
| 2016/0212526 A1 * | 7/2016 | Salvatti ................ H04R 1/44 |
| 2016/0231786 A1 | 8/2016 | English et al. |
| 2016/0254836 A1 | 9/2016 | Alsberg et al. |
| 2017/0006382 A1 * | 1/2017 | Luzzato ............... H04R 7/20 |

(56) References Cited

U.S. PATENT DOCUMENTS

FOREIGN PATENT DOCUMENTS

| JP | H0818637 A | 6/1994 |
| JP | 2001061530 A | 3/2001 |
| JP | 2001128272 A | 5/2001 |
| WO | 2011114188 A1 | 9/2011 |
| WO | 2012051358 | 12/2012 |
| WO | 2013027126 A2 | 2/2013 |

OTHER PUBLICATIONS

Nitto Denko Corporation, Vent filter applications Punched products TEMISH(R), downloaded from https://www.nitto.com/us/en/products/group/temish/001/ Jan. 16, 2018, 3 pages.

W.L. Gore & Associates, GORE(R) Portable Electronic Vents, dated 2016, downloaded from https://www.gore.com/sites/g/files/ypyipe116/files/2017-09/GORE_PEV_DataSheet_AcousticVents_Dust_Splash_0.pdf Jan. 16, 2018, 6 pages.

* cited by examiner

PROTECTIVE COVER FOR ELECTRONIC DEVICE

CROSS REFERENCE TO RELATED APPLICATIONS

This application claims priority to U.S. Provisional Application No. 62/460,004 filed Feb. 16, 2017, the disclosures of which are hereby incorporated by reference in their entirety.

BACKGROUND

Personal electronic devices are commonly used for communication, entertainment purposes, as well as Internet access and a variety of other purposes. Examples of personal electronic devices include smartphones, tablet computers, gaming devices, audio players, video players, cameras, portable computers, two-way radios, GPS receivers, smart glasses, virtual reality glasses or helmets, masks or eyewear including an electronic display, and/or other portable devices. Protective cases for electronic devices provide protection for the electronic device from various forms of damage, including damage from dust, water, snow, dirt, and drops. Exemplary protective cases can be found in U.S. Pat. No. 8,342,325, the disclosures of which are hereby incorporated by reference in their entirety. Common protective ratings are Ingress Protection, or IP ratings provided by the International Electrotechnical Commission.

Many electronic devices include one or more ports, including an audio port such as for a speaker or a microphone. In order to provide protection from water, an opening proximate to the audio port may be covered with a speaker acoustic material, such as a semi-permeable hydrophobic membrane, e.g. a GoreTex® membrane. Semi-permeable hydrophobic membranes prevent water from passing through the membrane up to certain pressure differences across the membrane. In some typical embodiments, the membrane prevents the passage of water through the membrane up to a differential pressure across the membrane of about 3 psi or greater. Some sound may be transmitted across the membrane, either from the environment to the electronic device in the case of a microphone port or from the electronic device to the environment in the case of a speaker port, either by passing through the membrane directly, or by the vibration of the membrane itself transmitting the sound. However, the quality or magnitude of the audio may be diminished by passing through the material. The quality may be improved through the use of a less dense speaker acoustic material that allows for more transmission of sound across the material. However, a less dense material provides less protection from liquid penetration. While a less dense material may provide splash resistance and limited water resistance, such material typically does not provide protection from immersion in water.

Improvements in the foregoing are desired.

BRIEF SUMMARY OF THE DESCRIPTION

A cover for protecting an audio port of an electronic device is provided. In one exemplary embodiment, the cover includes a check valve configured to move between a first position to allow audio pressure to exit the audio port when the cover is attached to the electronic device and a second position to fluidly seal the audio port when the cover is attached to the electronic device. The cover also includes a bellows configured to at least partially surround the audio port when the cover is attached to the electronic device and move the check valve from the first position to the second position in response to a pressure exerted on the bellows. The cover also includes an air vent attached to the bellows. The air vent is configured to allow audio pressure to pass through the air vent and to restrict passage of at least some water through the air vent when the cover is attached to the electronic device.

In one exemplary embodiment, a cover for reversible fluidly sealing an audio port of an electronic device from an external embodiment is provided. The cover includes a check valve movable between a first position defining a gap between the check valve and the audio port when the cover is attached to the electronic device and a second position configured to fluidly seal the audio port when the cover is attached to the electronic device. The cover also includes an air vent at least partially surrounding the check valve, the air vent being formed from a flexible semi-permeable membrane. In a more particular embodiment, the cover also includes a bellows at least partially surrounding the check valve, the bellows and the air vent configured to permit movement of the check valve between the first position and the second position in response to an external pressure.

In one exemplary embodiment, a cover for protecting an audio port of an electronic device is provided. The cover includes a seal configured to move between a first position to allow sound and/or audio pressure to exit the audio port when the cover is attached to the electronic device and a second position to fluidly seal the audio port when the cover is attached to the electronic device. The cover also includes a compressible material. The compressible material has a first uncompressed state and a second compressed state. The compressible material is configured to change from the first uncompressed state to the second compressed state in response to being contacted by a water pressure, thereby moving the seal from the first position to the second position. The cover also includes an air vent attached to the material. The air vent is configured to allow audio pressure to pass through the air vent and to restrict passage of at least some water through the air vent when the cover is attached to the electronic device.

In one more particular embodiment of any of the above embodiments, the cover is formed as a portion of or attached to a protective case at least partially covering or enclosing the electronic device.

In another more particular embodiment of any of the above embodiments, the cover is formed as a portion of the electronic device, such as a portion of a housing covering one or more internal components of the electronic device.

DETAILED DESCRIPTION

Figure 1:
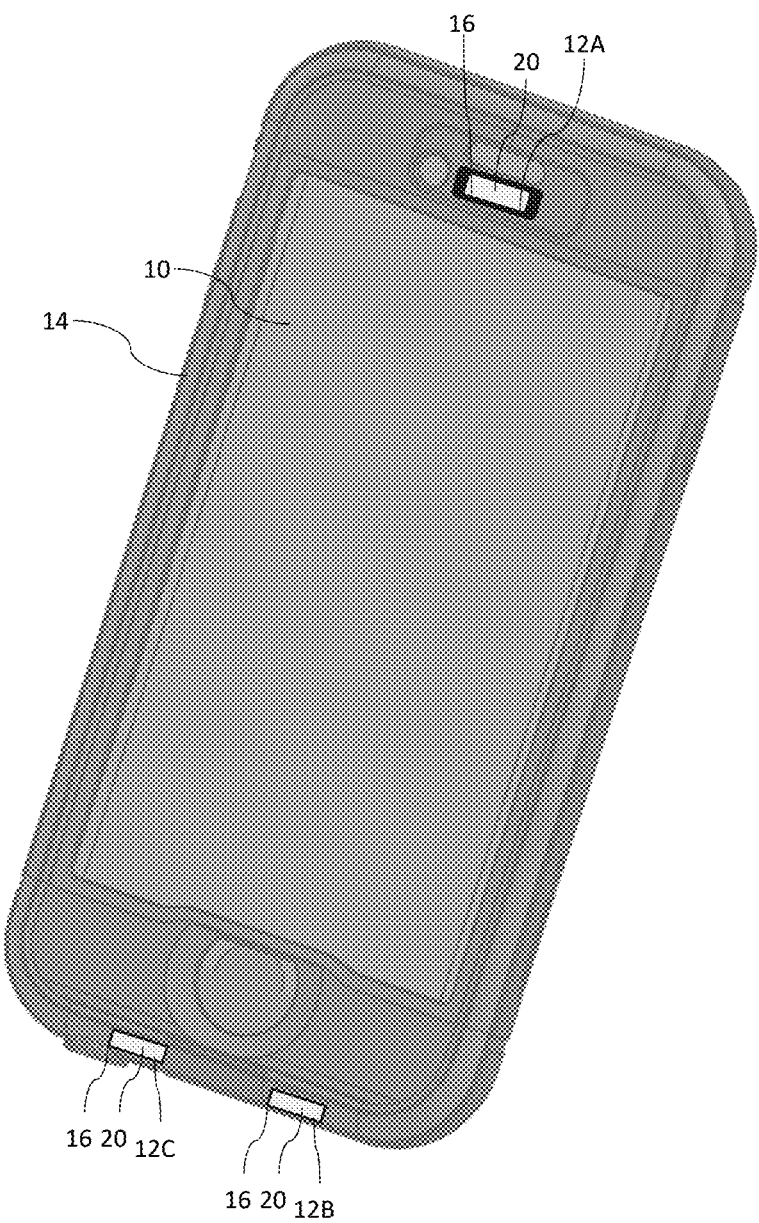
FIG. 1 illustrates an electronic device positioned in a protective case.

An exemplary electronic device 10 is illustrated in FIG. 1. Although a smartphone is illustrated, in other embodiments, electronic device 10 may be a tablet computer, a gaming device, an audio player, a video player, a fitness devise, a medical device, a camera, a portable computer, a two-way radio, a GPS receiver, and/or other portable devices. Electronic device 10 includes one or more audio ports 12, such as speaker ports 12A and 12B or microphone port 12C. Sound waves produced by a speaker (not shown) of electronic device 10 are transmitted to the user through one or more of speaker ports 12A, 12B. Sound waves from the user or environment are transmitted through microphone port 12C where they are received by a microphone (not shown) of electronic device 10.

Electronic device 10 is illustratively positioned in a protective case 14. Protective case 14 is configured to protect at least a portion of electronic device 10 from various forms of damage, such as damage from one or more of dust, water, snow, dirt, and drops. Protective case 14 includes one or more apertures 16 positioned proximate to each audio port 12 to allow sound waves to travel between the audio port 12 and environment. Each audio port 12 is illustratively covered by a cover 20 as discussed in more detail below. As shown in FIG. 1, cover 20 is formed as a portion of protective case 14 and covers both audio port 12 and aperture 16. In other embodiments, cover 20 is not part of protective case 14 and may be a part of electronic device 10, such as a housing covering one or more internal components of the electronic device 10, to protect audio port 12 of electronic device 10.

Figure 2:
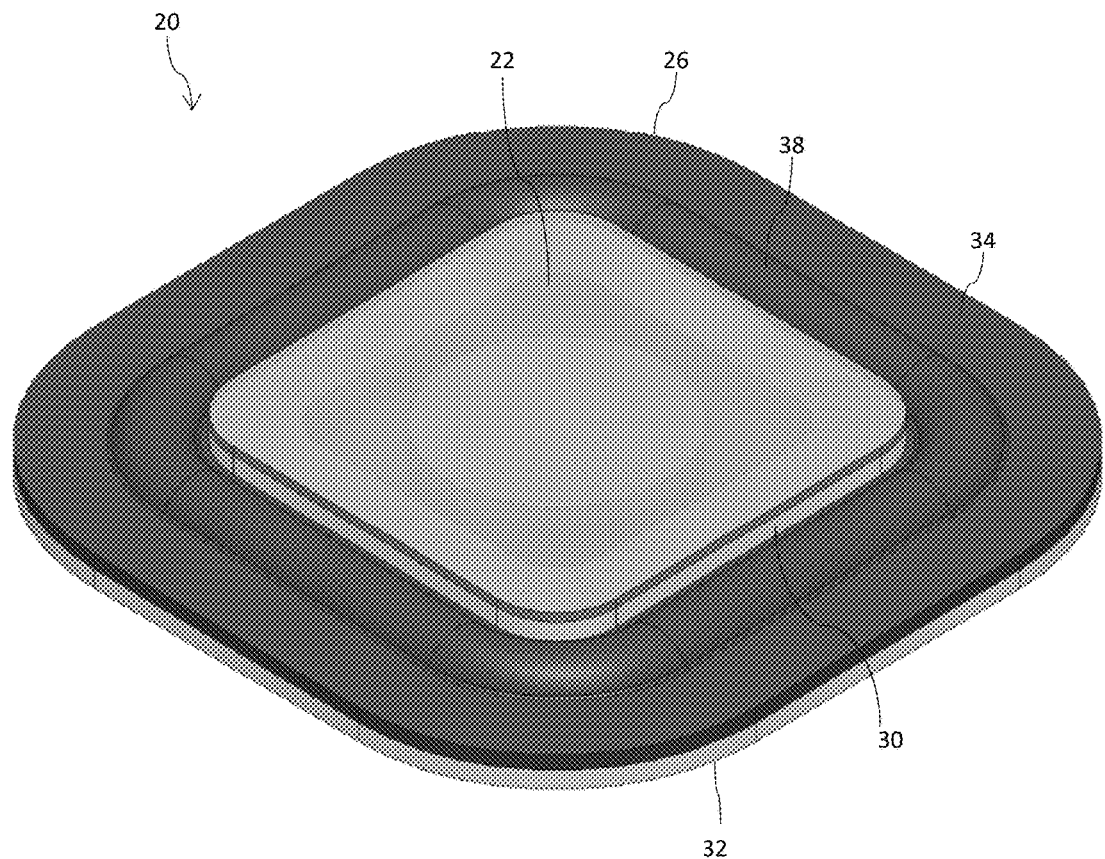
FIG. 2 illustrates an exemplary cover for an audio port.
Figure 3:
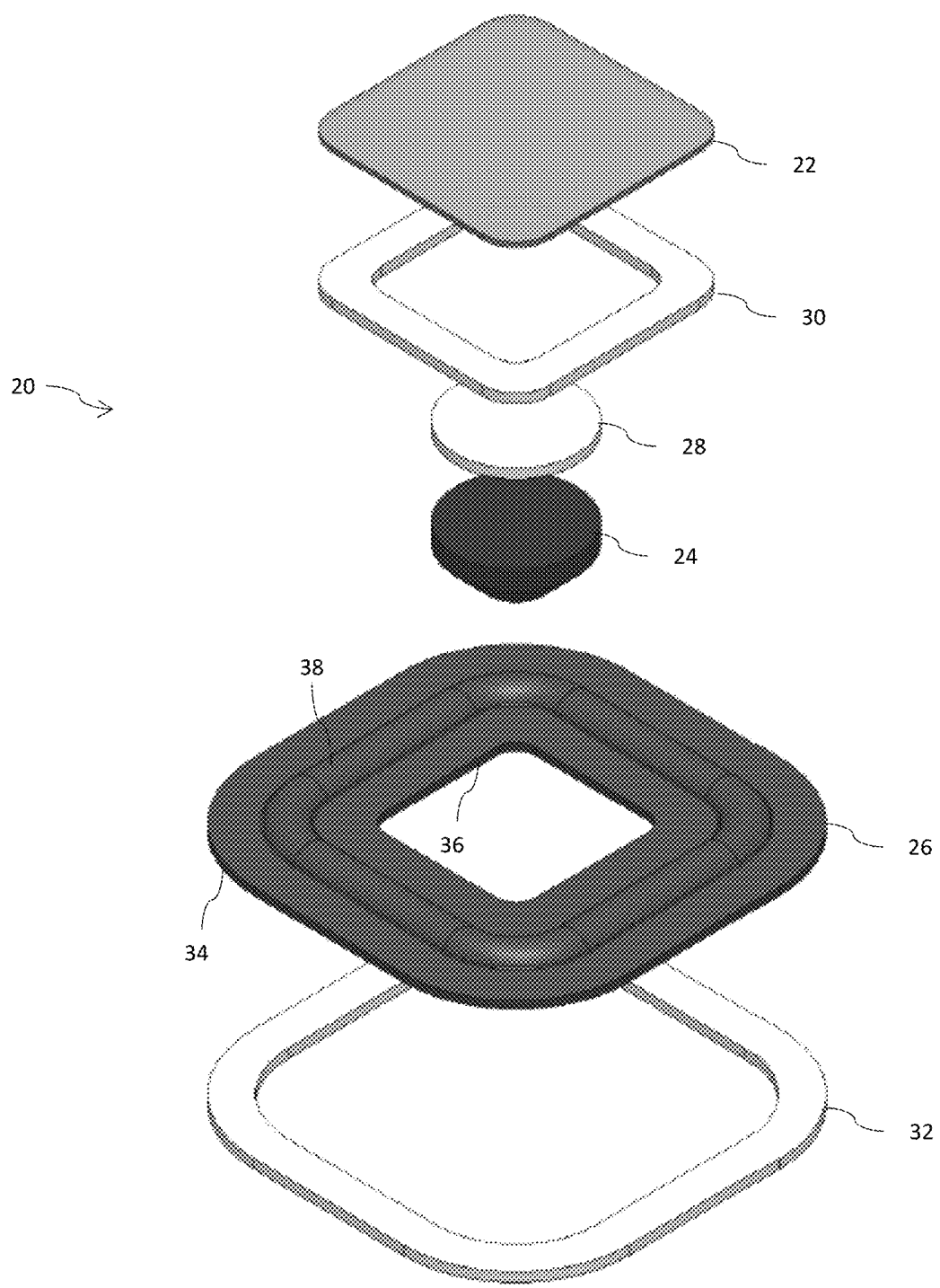
FIG. 3 illustrates an exploded view of the fluid seal of FIG. 2.
Figure 4:
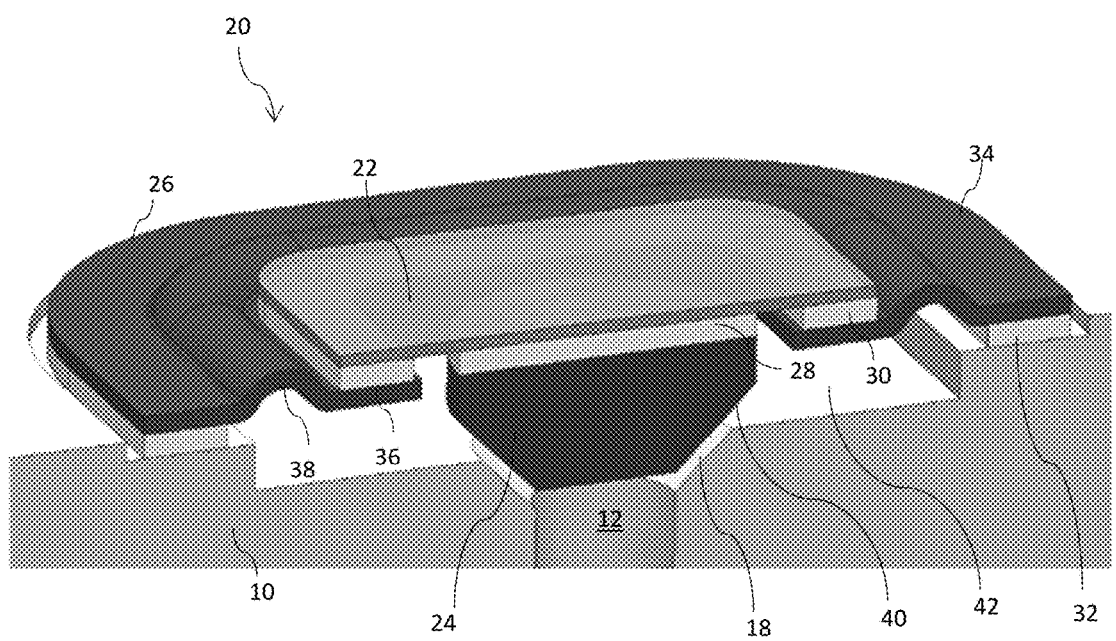
FIG. 4 illustrates a cross-sectional view of the fluid seal of FIG. 2.

FIGS. 2-4 illustrate an exemplary cover 20. FIG. 2 illustrates a perspective view of cover 20. FIG. 3 illustrates an exploded view of cover 20. FIG. 4 illustrates a cross-sectional view of cover 20 covering an exemplary audio port 12. In FIG. 4, cover 20 is illustrated as being adhered directly to an outer surface of electronic device 10. In other embodiments, the cover 20 is adhered to a portion of protective case 14 proximate audio port 12.

Cover 20 includes air vent 22, check valve 24, and bellows 26. Air vent 22 is illustratively attached to check valve 24 by first adhesive 28. Air vent 22 is illustratively attached to bellows 26 by second adhesive 30. Bellows 26 is illustratively attached to electronic device 10 by third adhesive 32. In another embodiment (not shown), bellows 26 is pressed against electronic device 10 by an external force, such as a protective case 14, to form a fluid seal between bellows 26 and electronic device 10.

Referring to FIG. 4, a cavity 42 is formed between the cover 20 and audio port 12. As shown in FIG. 4, the cavity 42 is at least partially defined by the air vent 22, bellows 26, and surface of the electronic device 10. Cavity 42 is in fluid communication with the audio port 12 when the check valve 24 is in the first position as illustrated in FIG. 4.

Air vent 22 is illustratively formed from a membrane that allows air pressure to pass through, while provides resistance to the passage of at least some fluid, such as water. Exemplary membranes include flexible, hydrophobic semi-permeable membranes, such as expanded non-woven acoustic vent materials formed from expanded polytetrafluoroethylene, cellulose, polyester, polyolefin, polypropylene, and/or polyethylene terephthalate. In some exemplary embodiments, air vent 22 is a membrane having a differential pressure across the membrane of about 2 psi or lower, about 1 psi or lower, or about 0.5 psi to about 1 psi. Air vent 22 allows air, such as sound waves, to pass through air vent 22 between audio port 12 and an external environment. The lower differential pressure of the membrane of air vent 22, compared to a typical membrane, corresponds to a less dense material, allowing for air to permeate air vent 22 and transmit sound with less loss and/or fewer audio issues such as double-talk, echo, feedback, and the like compared to a typical membrane.

In some exemplary embodiments, the flexibility of air vent 22 allows for good audio performance, including minimizing unwanted echo and feedback. In some exemplary embodiments, air vent 22 provides at least some protection to audio port 12 from a fluid, such as water, and from dust. In more particular embodiments, air vent 22 resists water from a splash or incidental contact from passing through air vent 22. However, air vent 22 may not provide protection from a greater pressure of water, such as would occur during water immersion, where the difference between the external water pressure and trapped air in the cavity 42 between the air vent 22 and the audio port 12 exceeds the maximum differential pressure across the membrane, such as 2 psi, 1 psi, 0.5 psi, or lower.

Bellows 26 is illustratively formed of a flexible material, such as a rubber. As illustrated in FIG. 4, outer portion 34 may be directly attached by third adhesive 32 to a portion of electronic device 10 proximate audio port 12. In other embodiments, outer portion 34 is attached to a portion of protective case 14 proximate audio port 12. Inner portion 36 is illustratively attached to air vent 22 by second adhesive 30. Middle portion 38 connects the outer portion 34 and inner portion 36. Middle portion 38 is configured to allow bellows 26 to flex between a first position, in which the check valve 24 is positioned above audio port 12, and a second position, in which the check valve 24 is positioned in contact with a portion of audio port 12 thereby fluidly sealing audio port 12 from the external environment.

As illustrated in FIG. 4, in some embodiments, middle portion 38 includes a curved profiled to bias the check valve in the first position, in which sound can enter and exit audio port 12. In some exemplary embodiments, an external pressure, such as a pressure exerted by a fluid such as water on bellows 26, adhesive 36, and/or air vent 22, causes the bellows to move from the first position to the second position thereby fluidly sealing the audio port 12 from the external environment, and preventing air, water, dust, or other contaminates from the external environment to enter audio port 12. Exemplary pressures include pressure exerted due to a splash of water on bellows 26, adhesive 36, and/or air vent 22 or pressure exerted due to immersion of cover 20 in water. Upon release or removal of the external pressure, or upon equalization of the external pressure and the pressure in cavity 42, the bias in bellows 26 moves the check valve 24 back to the first position, as shown in FIG. 4.

Check valve 24 is configured to fluidly seal audio port 12 from the external environment. In some exemplary embodiments, check valve 24 is formed from a thermoset or thermoplastic polymer, such as polyethylene terephthalate (PET). As discussed above, when check valve 24 is in a first position, air, including sound waves, can pass between audio port 12 and an environment outside cover 20 through air vent 22 and a gap formed between check valve 24 and a portion of audio port 12. In some exemplary embodiments, this gap is about 1 mm in height and extends around a lower angled edge 40 of check valve 24. Other suitable gap sizes may also be used.

Check valve 24 allows for bi-directional passage of air, such as sound waves between an external environment and audio port 12, but is configured to move from the first position illustrated in FIG. 4 to a second position in which the check valve 24 fluidly seals the audio port 12 from the external environment.

When cover 20 moves check valve 24 to the second position, the check valve 24 fluidly seals audio port 12 from the external environment so that a fluid, such as water, cannot pass from the environment into audio port 12. In some embodiments, check valve 24 includes an angled edge 40 configured to fluidly seal with a flared edge 18 of audio port 12. In other embodiments, check valve 24 includes a gasket or seal (see FIG. 5A) configured to contact a portion of electronic device 10 or case 14 proximate audio port 12 to fluidly seal audio port 12 from an external environment. In other embodiments (not shown), check valve 24 is configured to fluidly seal with a portion of protective case 14 proximate audio port 12. By providing a fluid seal to audio port 12 with check valve 24, cover 20 allows for a less restrictive material to be used for air vent 22. In some embodiments, this provides improved audio quality and/or volume compared to a fully-waterproof membrane while also providing protection for audio port 12 from immersion in water.

Figure 5A:
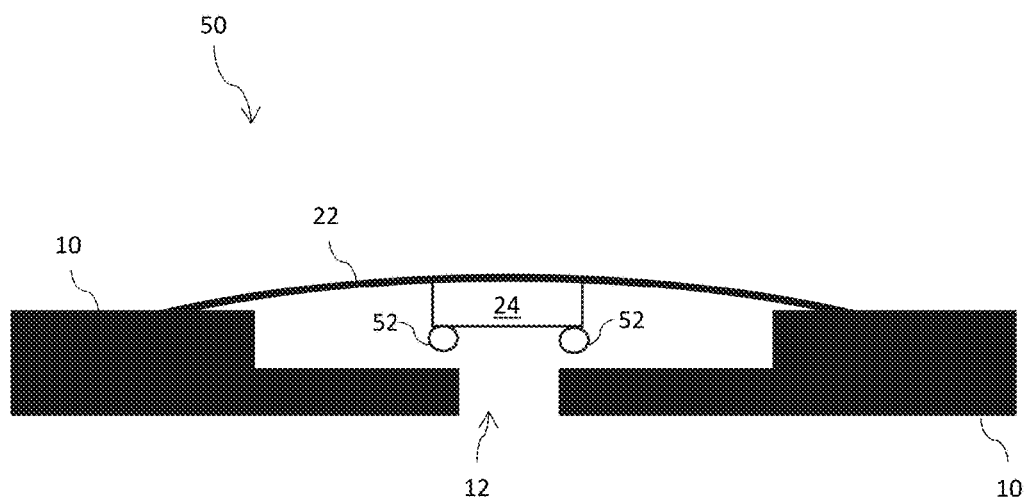
FIG. 5A illustrates another exemplary fluid seal for an audio port in a first position.
Figure 5B:
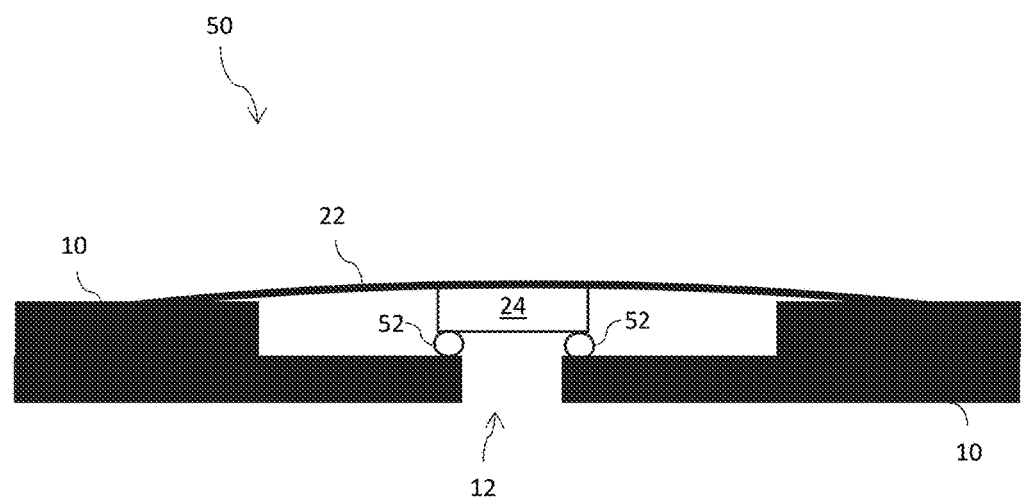
FIG. 5B illustrates the fluid seal of FIG. 5A in a second position.

Referring next to FIGS. 5A and 5B, a cross-sectional view of another exemplary cover 50 is illustrated. Cover 50 is similar to cover 20 and includes an air vent 22 that may be directly attached to a portion of electronic device 10 proximate an audio port 12 or attached to a portion of protective case 14 proximate audio port 12 to fluidly seal audio port 12 from water in an external environment. Air vent 22 is illustratively connected to a check valve 24. Check valve 24 includes a seal 52 around a bottom circumference of check valve 24 to contact a portion of electronic device 10 or case 14 proximate audio port 12 to fluidly seal audio port 12 from an external environment when the check valve 24 is in the second position, as shown in FIG. 5B.

As shown in FIG. 5A, the air vent 22 is typically biased to position the check valve 24 in the first position, in which a gap below a lower end of check valve 24 allows for air, including sound waves, to be transmitted between audio port 12 and an external environment through air vent 22. In some exemplary embodiments, this gap is about 1 mm in height and extends around the seal 52 of check valve 24. Other suitable gap sizes may also be used.

As illustrated in FIGS. 5A and 5B, cover 50 does not include a distinct bellows 26 (see FIG. 4), but rather the air vent 22 allows the check valve 24 to move between the first position illustrated in FIG. 5A and the second position illustrated in FIG. 5B.

An external pressure, such as a pressure exerted by a fluid such as water on air vent 22, causes the check valve 24 to move from the first position to the second position as shown in FIG. 5B, thereby fluidly sealing the audio port 12 from the external environment. Exemplary pressures include pressure exerted due to a splash of water on air vent 22 or pressure exerted due to immersion of cover 50 in water. Upon release of the pressure, the bias in air vent 22 moves the check valve 24 back to the first position, as shown in FIG. 5A.

Figure 6A:
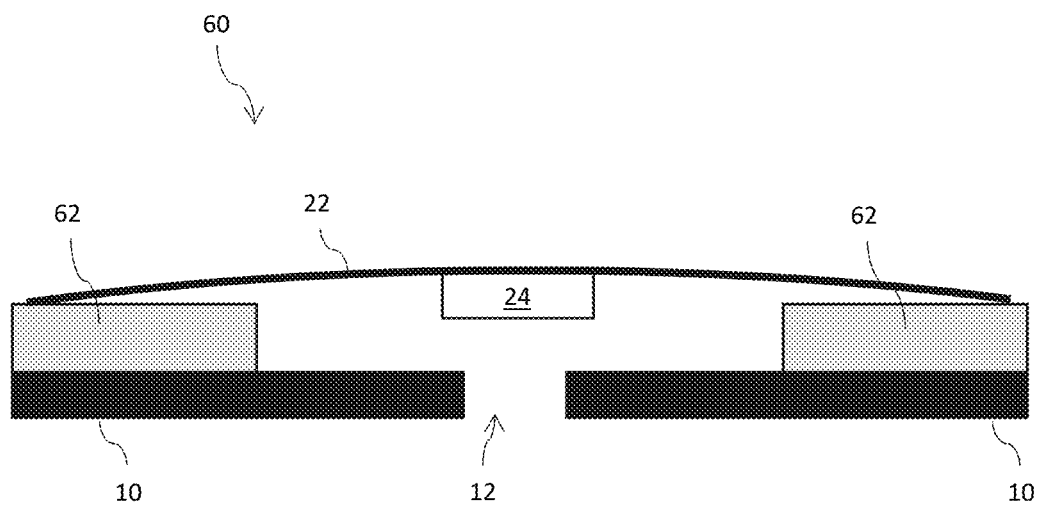
FIG. 6A illustrates still another exemplary fluid seal for an audio port in a first position.
Figure 6B:
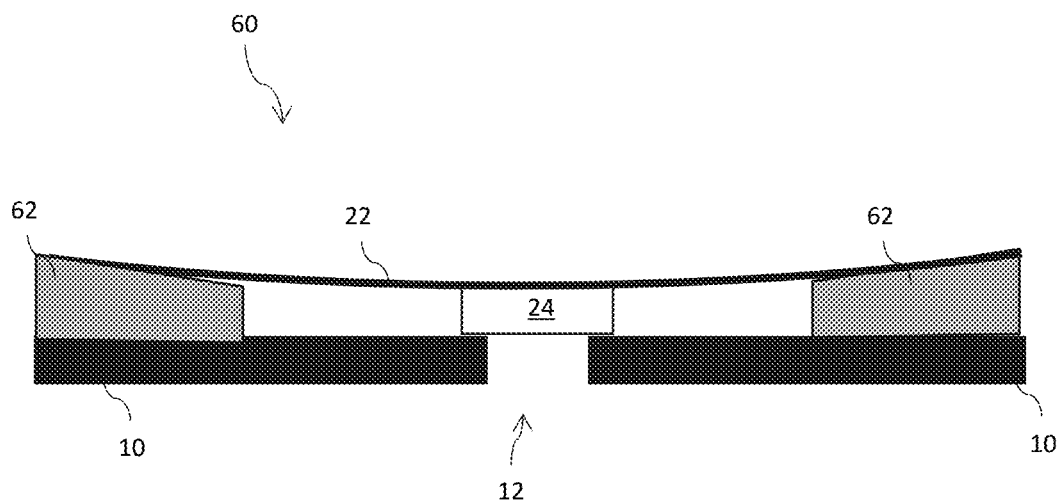
FIG. 6B illustrates the fluid seal of FIG. 6A in a second position.

Referring next to FIGS. 6A and 6B, a cross-sectional view of another exemplary cover 60 is illustrated. Cover 60 includes an air vent 22 attached to a compressible material 62 that may be directly attached to a portion of electronic device 10 proximate an audio port 12 or attached to a portion of protective case 14 proximate audio port 12 to fluidly seal audio port 12 from water in an external environment. Air vent 22 is illustratively connected to a check valve 24. Compressible material 62 is a material that reduces in size upon application of a pressure, such as upon contact with water. Exemplary compressible materials include microcellular urethanes such as PORON® products available from Rogers Corporation, Rogers Conn.

As shown in FIG. 6A, the compressible materials 62 are typically biased to position the check valve 24 in the first position, in which a gap below a lower end of check valve 24 allows for air, including sound waves, to be transmitted between audio port 12 and an external environment through air vent 22. In some exemplary embodiments, this gap is about 1 mm in height. Other suitable gap sizes may also be used. Upon contact with water, compressible materials 62 reduce in volume, which causes the check valve 24 to move from the first position to the second position as shown in FIG. 6B, thereby fluidly sealing the audio port 12 from the external environment. Upon removal of the water, the compressible materials 62 increase in volume, which moves the check valve 24 back to the first position, as shown in FIG. 6A.

Figure 7A:
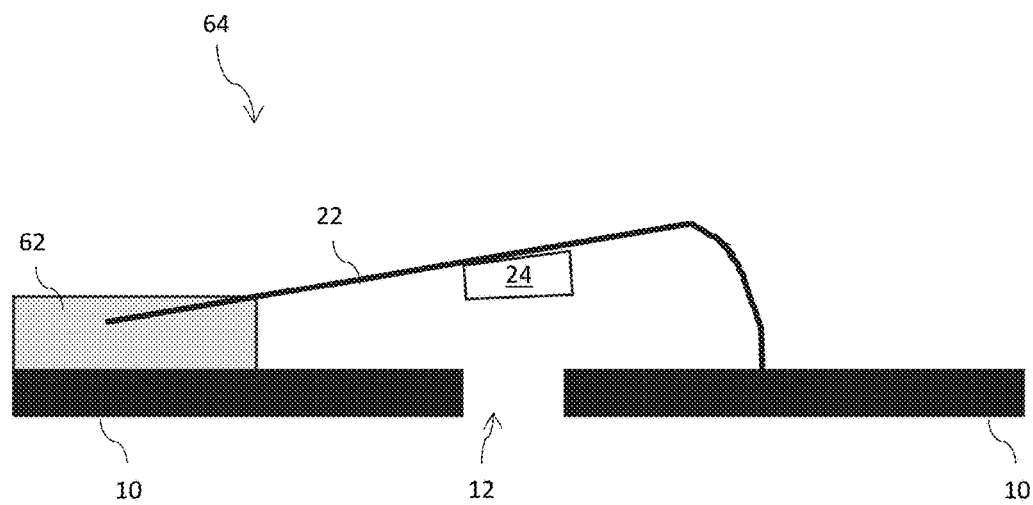
FIG. 7A illustrates yet another exemplary fluid seal for an audio port in a first position.
Figure 7B:
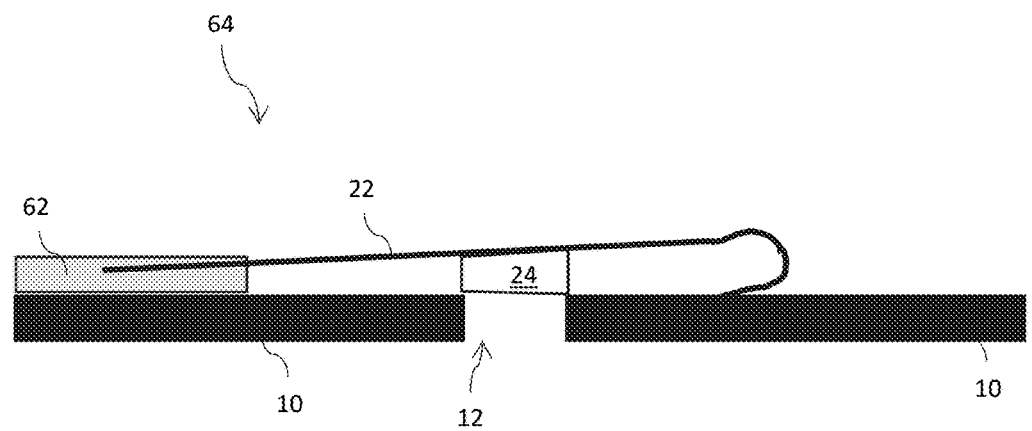
FIG. 7B illustrates the fluid seal of FIG. 7A in a second position.

Referring next to FIGS. 7A and 7B, a cross-sectional view of another exemplary cover 64 is illustrated. Cover 64 is similar to cover 60, but includes compressible material 62 on only one side of audio port 12. As shown in FIG. 7A, the compressible material 62 are typically biased to position the check valve 24 in the first position, in which a gap below a lower end of check valve 24 allows for air, including sound waves, to be transmitted between audio port 12 and an external environment through air vent 22. In some exemplary embodiments, this gap is about 1 mm in height. Other suitable gap sizes may also be used. Upon application of a pressure from a contact with water, compressible material 62 reduces in volume, which causes the check valve 24 to move from the first position to the second position as shown in FIG. 7B, thereby fluidly sealing the audio port 12 from the external environment. Upon removal of the water, the compressible materials 62 increase in volume, which moves the check valve 24 back to the first position, as shown in FIG. 7A. In some exemplary embodiments, an air vent 22 may extend to the surface of the electronic device 10 to prevent water from a splash from entering audio port 12.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A cover for protecting an audio port of an electronic device, the cover comprising:
a check valve configured to move between a first position to allow audio pressure to exit the audio port when the cover is attached to the electronic device and a second position to fluidly seal the audio port when the cover is attached to the electronic device;
a bellows configured to at least partially surround the audio port when the cover is attached to the electronic device and move the check valve from the first position to the second position in response to a pressure exerted on the bellows; and
an air vent attached to the bellows, the air vent configured to allow the audio pressure to pass through the air vent and to restrict passage of at least some water through the air vent when the cover is attached to the electronic device, the air vent comprising a flexible, hydrophobic semi-permeable membrane configured to prevent the transfer of water across the membrane at a differential pressure across the membrane of less than 2 psi.

2. The cover according to claim 1, wherein the check valve is connected to and at least partially surrounded by the air vent, and wherein the air vent is connected to and at least partially surrounded by the bellows.

3. The cover according to claim 1, wherein the bellows are configured to fully surround the audio port.

4. The cover according to claim 1, wherein the bellows are configured to move the check valve about 1 mm in distance between the first position and the second position.

5. The cover according to claim 1, wherein the flexible, hydrophobic, semi-permeable membrane is configured to prevent the transfer of water across the membrane at a differential pressure across the membrane of about 0.5 psi to about 1 psi.

6. The cover according to claim 1, wherein the check valve is configured such that at least a portion of the check valve is positioned in the audio port when the check valve is in the second position.

7. The cover according to claim 1, wherein the cover is formed as a portion of a protective case configured to receive at least a portion of the electronic device.

8. The cover according to claim 1, wherein the air vent comprises an expanded non-woven acoustic vent material.

9. The cover according to claim 1, wherein the air vent comprises an expanded non-woven material selected from the group consisting of polytetrafluoroethylene, cellulose, polyester, polyolefin, polypropylene, and polyethylene terephthalate.

10. A cover for reversible fluidly sealing an audio port of an electronic device from an external environment, the cover comprising:
a check valve movable between a first position defining a gap between the check valve and the audio port when the cover is attached to the electronic device and a second position configured to fluidly seal the audio port when the cover is attached to the electronic device; and
an air vent at least partially surrounding the check valve, the air vent being formed from a flexible semi-permeable membrane configured to prevent the transfer of water across the membrane at a differential pressure across the membrane of less than 2 psi.

11. The cover according to claim 10, further comprising a bellows at least partially surrounding the check valve, the bellows and the air vent configured to permit movement of the check valve between the first position and the second position in response to an external pressure.

12. The cover according to claim 11, wherein the bellows at least partially surrounds the air vent, the bellows including a curved portion extending away from the audio port, the curved portion of the bellows biasing the check valve in the first position.

13. The cover according to claim 10, wherein the air vent is configured to allow audio pressure to pass through the air vent and to restrict passage of at least some water through the air vent when the cover is attached to the electronic device.

14. The cover according to claim 10, wherein the gap between the check valve and the audio port is about 1 mm or less when the check valve is in the first position.

15. The cover according to claim 10, wherein the check valve includes at least one angled edge configured to fluidly seal with a flared edge of the audio port when the check valve is in the second position.

16. A cover for protecting an audio port of an electronic device, the cover comprising:
a seal configured to move between a first position to allow sound and/or audio pressure to exit the audio port when the cover is attached to the electronic device and a second position to fluidly seal the audio port when the cover is attached to the electronic device;
a compressible material, the compressible material having a first uncompressed state and a second compressed state, the compressible material configured to change from the first uncompressed state to the second compressed state in response to being contacted by a water pressure thereby moving the seal from the first position to the second position; and
an air vent attached to the compressible material, the air vent configured to allow the audio pressure to pass through the air vent and to restrict passage of at least some water through the air vent when the cover is attached to the electronic device, wherein the air vent comprises a flexible semi-permeable membrane configured to prevent the transfer of water across the membrane at a differential pressure across the membrane of less than 2 psi.

17. The cover of claim 16, wherein the compressible material at least partially surrounds the audio port.

18. The cover of claim 16, wherein the compressible material is positioned only on one side of the audio port.

* * * * *